United States Patent [19]
Miller et al.

[11] Patent Number: 5,257,828
[45] Date of Patent: Nov. 2, 1993

[54] METHOD AND APPARATUS FOR CONTROLLING DAMPING IN AN ELECTRIC ASSIST STEERING SYSTEM FOR VEHICLE YAW RATE CONTROL

[75] Inventors: Joseph D. Miller, Farmington Hills, Mich.; James H. Galloway, Brookefield, Conn.

[73] Assignee: TRW Inc., Lyndhurst, Ohio

[21] Appl. No.: 893,512

[22] Filed: Jun. 3, 1992

[51] Int. Cl.⁵ .............................................. B62D 5/04
[52] U.S. Cl. ................................... 180/79.1; 180/142; 364/424.05
[58] Field of Search ................... 180/79.1, 141, 142; 364/424.05

[56] References Cited

U.S. PATENT DOCUMENTS

| | | | |
|---|---|---|---|
| 4,107,595 | 8/1978 | Campe | 318/696 |
| 4,415,054 | 11/1983 | Drutchas | 180/79.1 |
| 4,621,327 | 11/1986 | Dolph et al. | 364/424 |
| 4,660,671 | 4/1987 | Behr et al. | 180/142 |
| 4,670,696 | 6/1987 | Byrne et al. | 318/701 |
| 4,695,780 | 8/1987 | Kurakake et al. | 318/561 |
| 4,735,271 | 4/1988 | Shimizu | 180/79.1 |
| 4,771,843 | 9/1988 | Shimizu | 180/79.1 |
| 4,819,170 | 4/1989 | Shimizu | 180/79.1 X |
| 4,868,477 | 9/1989 | Anderson et al. | 318/696 |
| 4,896,089 | 1/1990 | Kliman et al. | 318/701 |
| 4,961,038 | 10/1990 | MacMinn | 318/696 |
| 5,012,172 | 4/1991 | Sember | 318/696 |
| 5,038,090 | 8/1991 | Kawabata et al. | 318/721 |
| 5,072,166 | 12/1991 | Ehsani | 318/696 |
| 5,075,608 | 12/1991 | Erdman et al. | 318/599 |

FOREIGN PATENT DOCUMENTS

| | | | |
|---|---|---|---|
| 60154955 | 8/1985 | Japan | 180/79.1 |
| 0114574 | 5/1989 | Japan | 180/79.1 |
| 2170157 | 7/1986 | United Kingdom | 180/79.1 |
| 2205287 | 12/1988 | United Kingdom | 180/79.1 |

OTHER PUBLICATIONS

"A Simple Motion Estimator for VR Motors", by W. D. Harris and J. H. Land.
"A State Observer for Variable Reluctance Motors: Analysis and Experiments", by A. Lumsdaine; J. H. Lang; M. J. Balas.

Primary Examiner—Margaret A. Focarino
Assistant Examiner—Peter C. English
Attorney, Agent, or Firm—Tarolli, Sundheim & Covell

[57] ABSTRACT

An electric assist steering system comprises a steering torque sensor and an electric assist variable reluctance motor operatively connected to a steering member. A motor control signal is provided in response to a value of the torque signal for control of the assist motor. A motor speed sensor senses speed of the power assist motor and a vehicle speed sensor senses the vehicle speed. A control circuit modifies the motor control signal in response to the sensed motor speed and the sensed vehicle speed signal so as to provide damping that is functionally related to both the motor speed and the vehicle speed for vehicle yaw rate control.

7 Claims, 7 Drawing Sheets

METHOD AND APPARATUS FOR CONTROLLING DAMPING IN AN ELECTRIC ASSIST STEERING SYSTEM FOR VEHICLE YAW RATE CONTROL

TECHNICAL FIELD

The present invention is directed to a power assist steering system and is particularly directed to an improved method and apparatus for controlling an electric assist steering system.

BACKGROUND OF THE INVENTION

There are many known power assist steering systems for automotive vehicles. Some provide steering assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

In U.S. Pat. No. 3,983,953 an electric motor is coupled to the input steering shaft and energized in response to the torque applied to the steering wheel by the vehicle operator An electronic control system includes a torque sensor and uses the output of a vehicle speed sensor. A computer receives the output signals provided by both sensors. The computer controls the amount of the assistance provided by the motor dependent upon the applied steering torque and the sensed vehicle speed.

U.S. Pat. No. 4,415,054 (now U.S. Reissue Patent No. 32,222, hereinafter, "the Drutchas steering gear") utilizes an D.C. electric assist motor driven through an H-bridge arrangement. The motor includes a rotatable armature encircling a steering member which has a thread convolution portion thereon and a portion having straight cut rack teeth thereon. Rotation of the electric assist motor armature causes linear movement of the steering member through a ball-nut drive arrangement in combination with the thread convolution portion of the steering member. A torque sensing device is coupled to the steering column to sense driver applied input torque to the steering wheel. The torque sensing device uses a magnet Hall-effect sensor arrangement for sensing relative rotation between the input and output shafts across a torsion bar. An electronic control unit monitors the signal from the torque sensing device and controls the electric assist motor in response thereto.

U.S. Pat. No. 4,660,671 discloses an electric controlled steering system that is based on the Drutchas steering gear. In the arrangement shown in the '671 patent, the D.C. motor is axially spaced from the ball-nut and is operatively connected thereto, through a connection tube. The electronic controls include a plurality of diagnostic features that monitor the operation of the steering system. If an error in the operation of the electric steering system is detected, the power assist system is disabled and steering reverts to an unassisted mode.

Hydraulic power assist steering systems have an inherent yaw damping characteristic during a steering maneuver. Such damping characteristic in a power assist steering system is particularly important when the vehicle is traveling at a relatively high speed. It is therefore desirable to provide such a yaw damping characteristic in an electric assist steering system that would, at least, simulate that provided by a hydraulic power assist steering system and, preferably, improve thereupon A prior art electric assist steering system provided damping by switching a load resistor across the electric assist motor when the vehicle speed exceeded a predetermined value. When the vehicle speed was below the predetermined value or when applied steering torque exceeded a predetermined amount, the resistor was disconnected from across the motor. This method of damping was used to control the yaw rate of the vehicle when the road wheels returned after a turn.

SUMMARY OF THE INVENTION

The present invention provides an improved electric assist steering system that provides a damping characteristic by sensing the rotational rate of the electric assist motor and adjusting a motor control signal to the electric assist motor in response to the sensed rotational rate in a manner that provides the desired damping characteristic. The damping characteristic is further adjusted in response to the sensed vehicle speed so that damping increases as sensed vehicle speed increases.

In accordance with one embodiment of the present invention, an electric assist steering system is provided comprising torque sensor means for sensing applied steering torque and providing a torque signal having a value indicative of the applied steering torque. An electric assist motor is operatively connected to a steering member for, when energized, providing power steering assist. A motor control signal is provided in response to the value of tho torque signal. Motor speed sensor means is provided for sensing speed of said electric assist motor and for providing a motor speed signal indicative thereof. Means for modifying said motor control signal in response to said motor speed signal are provided so as to provide damping as a function of said sensed motor speed for vehicle yaw rate control and enhanced steering feel.

In accordance with another embodiment of the present invention, a method for controlling an electric assist steering system is provided including the steps of (a) sensing applied steering torque and providing a torque signal having a value indicative of applied steering torque; (b) providing an electric assist motor operatively connected to a steering member for, when energized, providing power steering assist; (c) providing a motor control signal in response to said torque signal for control of said motor; (d) sensing speed of said electric assist motor and providing a motor speed signal indicative thereof; and (e) modifying said motor control signal in response to said motor speed signal so as to provide damping as a function of said sensed motor speed for vehicle yaw control and enhanced steering feel.

In accordance with a preferred embodiment of the present invention an electric assist steering system comprises torque sensor means for sensing applied steering torque and providing a torque signal having a value indicative of the applied steering torque. An electric assist variable reluctance motor is operatively connected to a steering member so that, when energized, it provides power assist steering. The variable reluctance motor has a rotor and a stator Rotor position of the motor is sensed and rotor speed is derived therefrom. A motor control signal is provided in response to sensed applied steering torque for control of the motor. Vehicle speed sensing means are provided for sensing vehicle speed and for providing a vehicle speed signal indicative thereof The electric assist steering system further comprises means for modifying said motor control signal in response to said rotor speed and said vehicle speed signal so as to provide damping as a function of both said sensed motor speed and said vehicle speed to control vehicle yaw rate and improve steering feel. Preferably, the motor control signal is modified by modifying the value of the torque signal in response to the sensed rotor speed of the motor.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
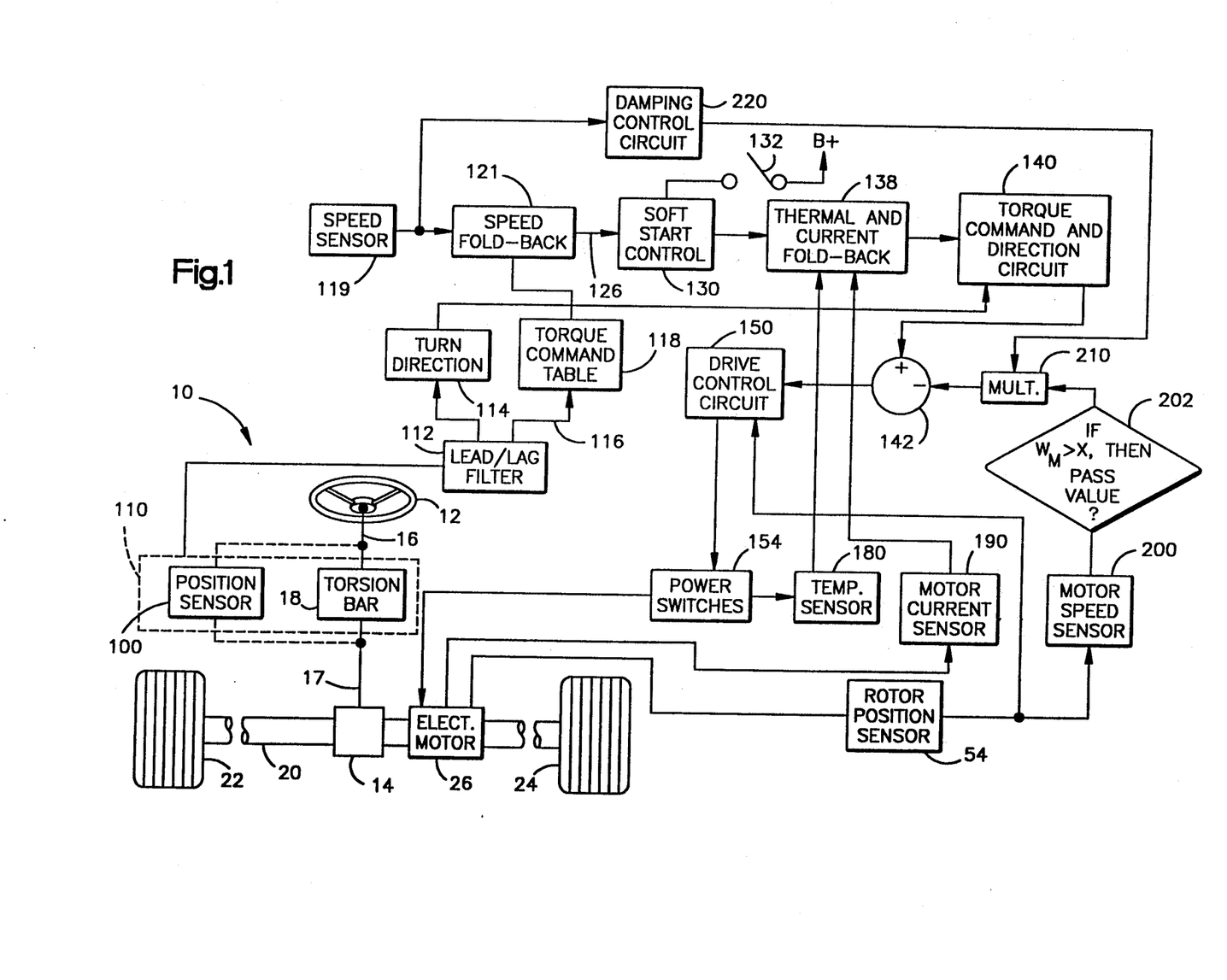
FIG. 1 is a schematic block diagram illustrating a power assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set The rack is steerably coupled to the vehicle'teerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axes and the vehicle is steered.

An electric assist motor 26 is drivingly connected to the rack 20. When the electric motor 26 is energized, it provides power assist steering so as to aid in the rotation of the vehicle steering wheel by the vehicle operator. In accordance with a preferred embodiment of the present invention, the electric assist motor is a variable reluctance motor. A variable reluctance motor is desirable for use in an electric assist steering system because of its small size, low friction, and its high torque-to-inertia ratio.

Figure 2:
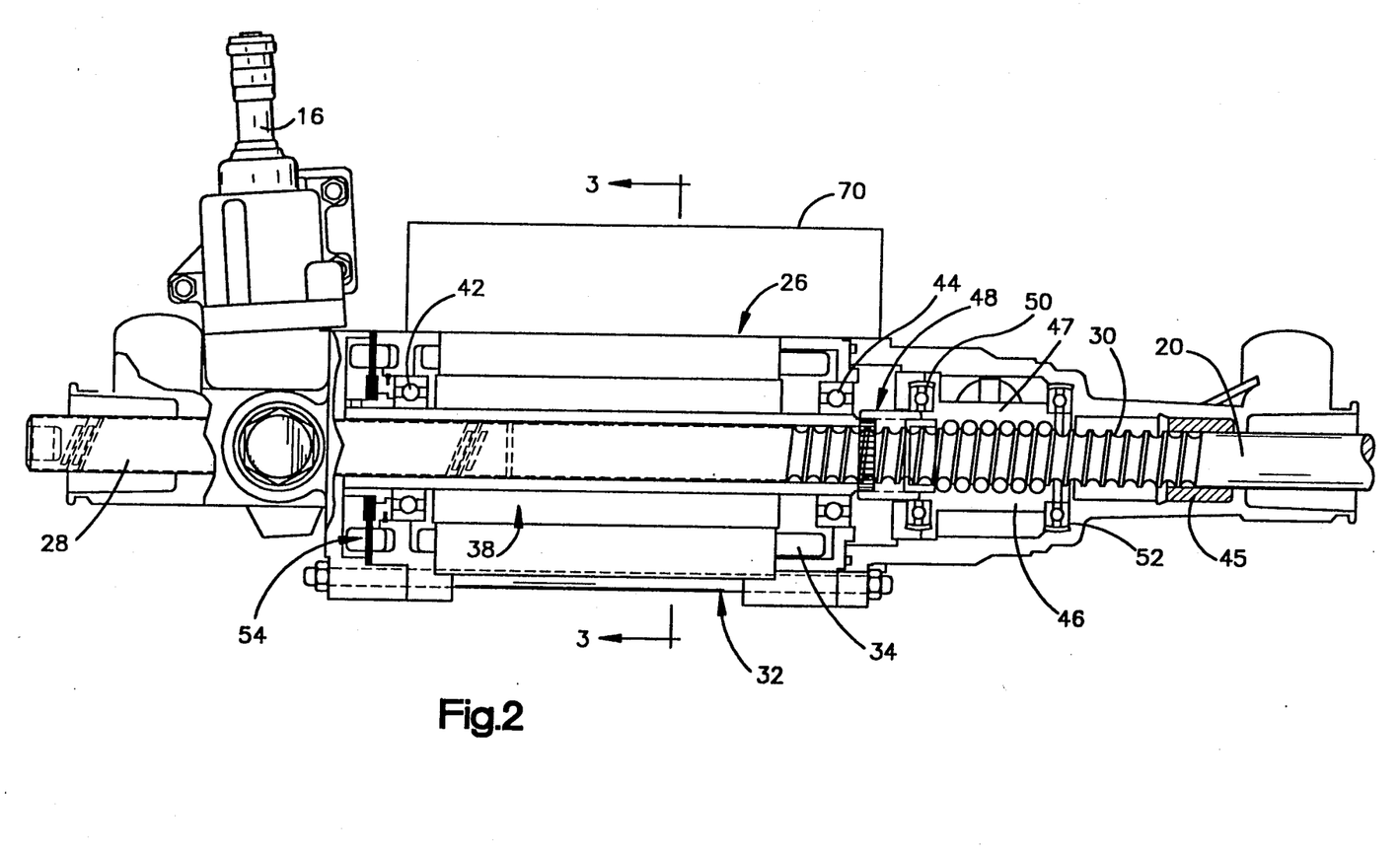
FIG. 2 is a plan view partially in section of a portion of the power assist steering system of FIG. 1.
Figures 3, 4, 5A, 5B:
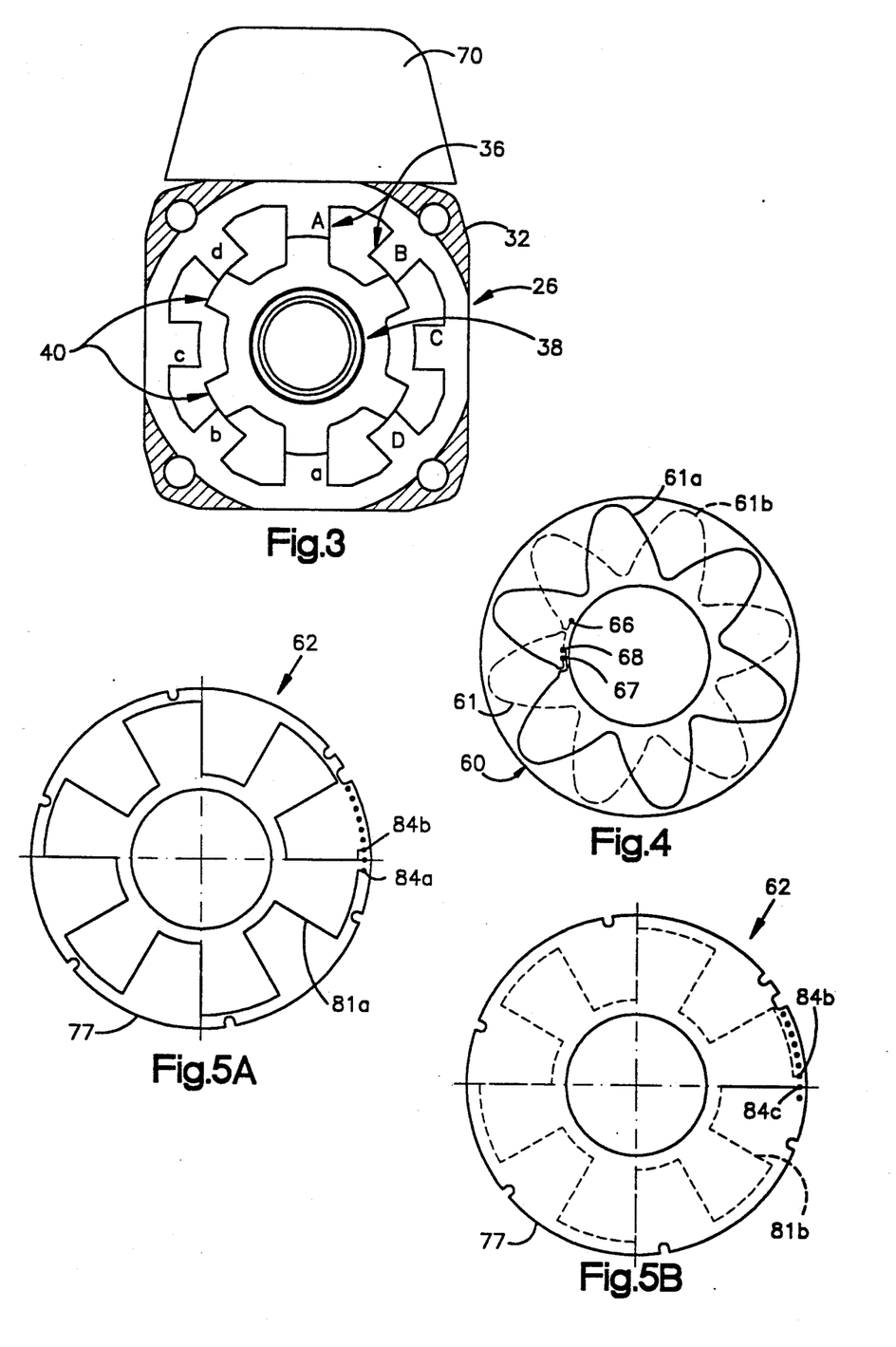
FIG. 3 is a cross section view as seen from the line 3—3 of FIG. 2.
FIG. 4 is a plan view of the transmitter portion of the motor position sensor shown in FIG. 1.
FIG. 5A is a plan view of one layer of the receiver disk of the rotor position sensor shown in FIG. 1 showing the receiver pattern on the top face of that layer.
FIG. 5B is a plan view as viewed from the top face of the one layer of the receiver disk of the rotor position sensor shown in FIG. 1 showing the receiver pattern on the bottom face of that layer.

Referring to FIGS. 2 and 3, the rack 20 has a straight rack tooth portion 28 in meshing engagement with the pinion gear. The rack 20 also has a threaded convolution portion 30. The variable reluctance motor 26 circumscribes the rack 20 and is mounted in a motor housing 32. The motor 26 includes a plurality of stator windings 34, each one wrapped about its associated stator pole 36. The motor 26 also includes a rotor 38 having a plurality of rotor poles 40. In a preferred embodiment of the present invention, the variable reluctance motor includes eight stator poles and six rotor poles. The stator poles are arranged so as to be energizes in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized. The direction of motor rotation is controlled by the sequence in which the stator coils are energized. The torque produced by the motor is controlled by the current through the stator coils. A preferred manner for controlling a variable reluctance motor so as to control motor torque and direction without torque ripple are fully disclosed in U.S. Pat. No. 4,868,477, which is hereby fully incorporated herein by reference.

The motor 26 is mounted in the motor housing 32 and rotatably supports the rack 20 through bearings 42, 44. The rack is also supported by the pinion gear and bearing 45. The motor rotor is drivingly connected to a ball-nut drive arrangement 46 through a connection tube 48. The ball-nut drive arrangement 46 circumscribes the threaded convolution portion 30 of the rack 20 with the nut portion being operatively connected to the threaded convolution portion of the rack through a plurality of balls 47. Such an arrangement is fully described in the above-mentioned Drutchas U.S. Pat. No. 4,415,054, now U.S. Reissue Patent No. 32,222, which is hereby fully incorporated herein by reference. Basically, when the motor is energized, the rotor turns which, in turn, rotates the nut portion of the ball-nut drive arrangement. When the nut rotates, the balls transfer a linear force to the rack. The direction of rack movement is dependent upon the direction of rotation of the motor. The nut is rotatably supported in the housing 32 by thrust bearings 50, 52.

A rotor position sensor 54 is operatively connected to the motor rotor and to the motor housing. The function of the rotor position sensor is to provide an electrical signal indicative of the position of the rotor relative to the motor stator. For proper operation of the variable reluctance motor, including direction of rotation and applied torque, it is necessary to know the position of the rotor relative to the stator.

In the preferred embodiment of the present invention, a physical rotor position sensor is provided. It is known in the art that the rotor position can be determined by means other than a physical position sensor. For example, it is possible to monitor the current through the unenergized stator coils and, based upon the sensed current, the rotor position is determined. One specific arrangement for sensing rotor position without a separate position sensor is disclosed in U.S. Pat. No. 5,072,166 which is hereby fully incorporated herein.

The present invention contemplates the use of both a separate position sensor and an algorithm that determines the rotor position based on some measured operating parameter such as current in an unenergized coil.

Referring to FIGS. 4–9, a rotor position is shown. The sensor is a two part device including a transmitter disk 60 having a primary winding 61 and a multi-layer receiver disk 62. The disks are preferably made from a circuit board material with conductive electrical tracks mounted thereon. The method for mounting the tracks is known in the art. The disks 60, 62 form a rotary transformer 74.

Figures 8, 10:
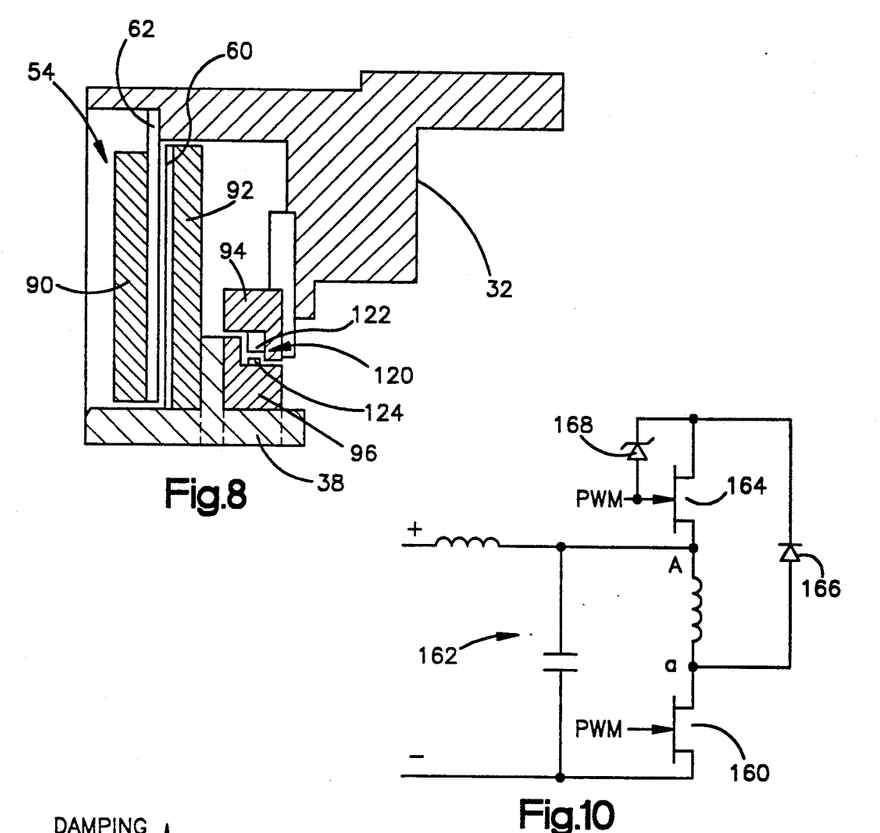
FIG. 8 is a side sectional view of a portion of the motor position sensor shown in FIG. 1.
FIG. 10 is a circuit schematic of the power switch shown in FIG. 1.
Figure 9:
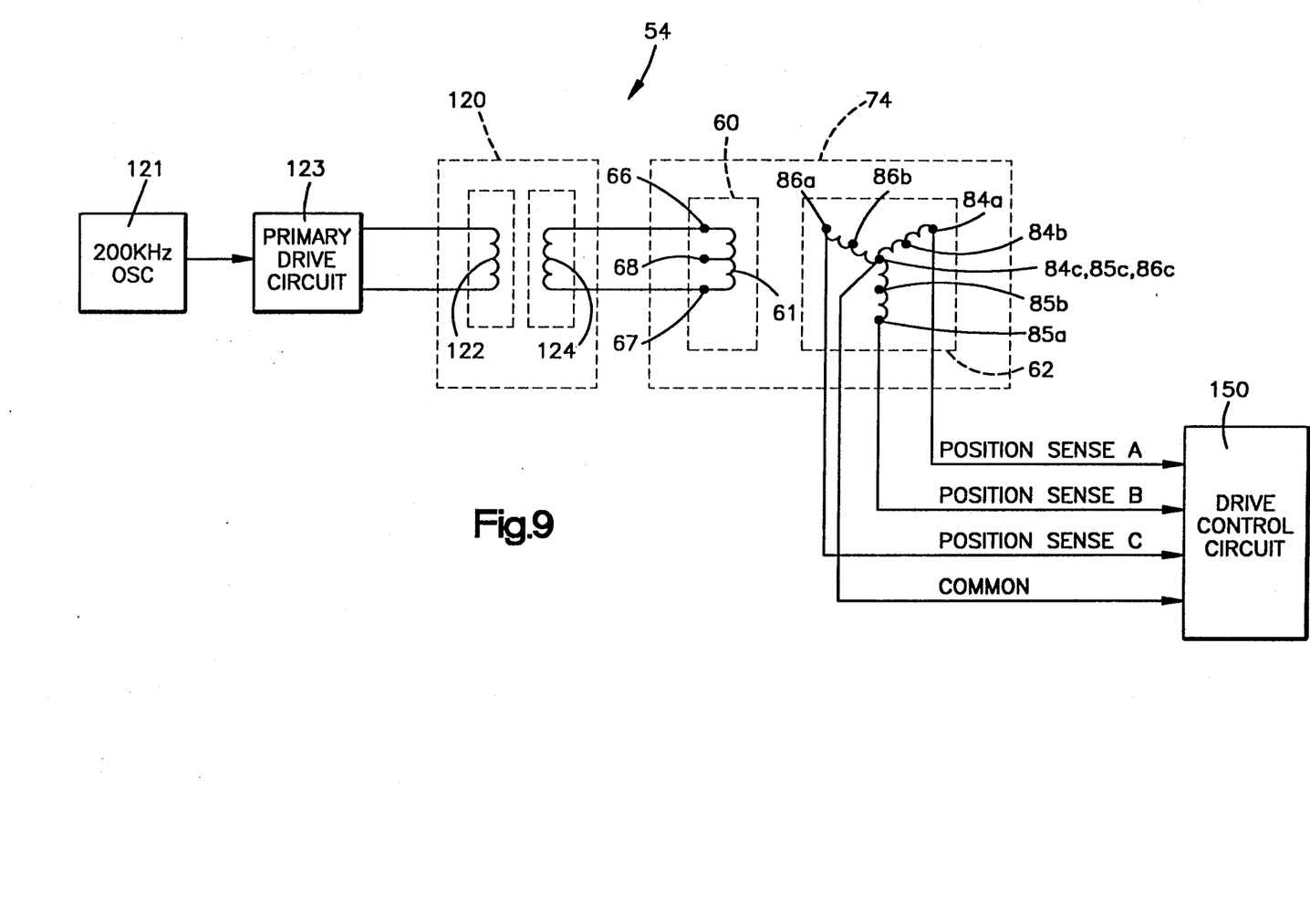
FIG. 9 is a schematic circuit diagram of the drive arrangement for the rotor position sensor.

A second rotary transformer 120 is operatively coupled between the housing 32 and the rotor 38. The second rotary transformer 120 includes a primary coil 122 mounted to the housing 32 and electrically connected to a signal generator 121 through a primary drive circuit 123. The rotary transformer 120 further includes a secondary coil 124 mounted to the rotor 38 and electrically connected to the transmitter primary coil 61 of the transmitter disk 60. The purpose of the second rotary transformer 120 is to couple the sinusoidal drive signal from the drive circuit 123 to the primary drive coil 61 of the rotary position sensor 54. For the electric coupling to occur between the coils 122, 124, the two coils must be axially aligned and spaced within a sufficiently close radial proximity to insure EMF coupling.

The transmitter disk 60 is made from a circuit board material and is mounted to the rotor 38 so that its two planar surfaces are substantially perpendicular to the axis of the rotor. The primary winding 61 on the transmitter disk is arranged in the form of a circle pattern conforming to the following equation:

$$C = R \times \sin(6\alpha)$$

where C equals the radial distance of the pattern from the center of rotation of the disk, R equals the average radius of the pattern, and $\alpha$ equals the mechanical angle in degrees The number six is the number of poles (twelve) divided by two. The pattern on one side of the disk is designated 61a. A pattern, designated 61b, is formed on the other side of the transmitter disk 60 and is in the form of this same equation and positioned 180 electrical degrees out of phase with the pattern 61a.

The two patterns 61b, 61a each have a first connection point 66, 67, respectively, and a common connection point 68 connected to the other patterns common connection point. The secondary coil 124 of the rotary transformer 120 is connected to the connection points 66, 67 of the two patterns 61b, 61a, respectively.

The receiving disk 62 is mounted to the housing 32 and axially spaced from the transmitting disk 60 but in operative EMF coupling communication therewith. The receiving disk 62 has its planar surfaces substantially parallel to the planar surfaces of the transmitter disk 60.

Figure 6A:
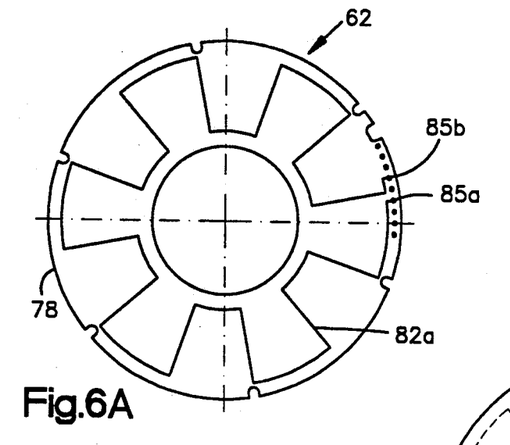
FIG. 6A is a plan view of a second layer of the receiver disk of the rotor position sensor shown in FIG. 1 showing the receiver pattern on the top face of that layer.
Figure 6B:
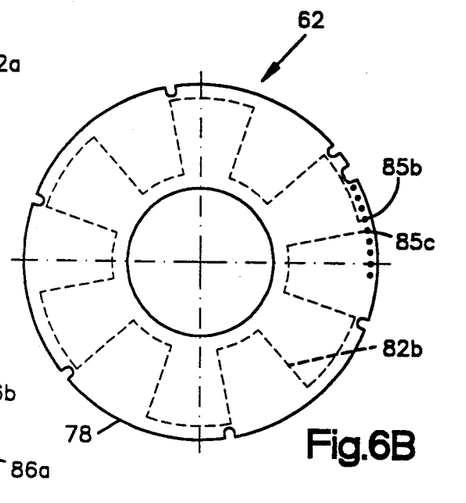
FIG. 6B is a plan view as viewed from the top face of the second layer of the receiver disk of the rotor position sensor shown in FIG. 1 showing the receiver pattern on the bottom face of that layer.
Figure 7A:
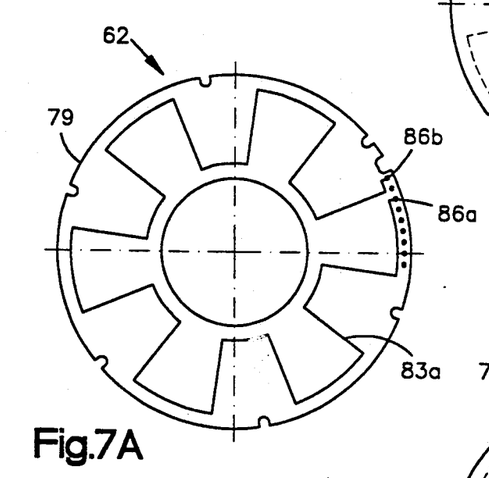
FIG. 7A is a plan view of a third layer of the receiver disk of the rotor position sensor shown in FIG. 1 showing the receiver pattern on the top face of that layer.
Figure 7B:
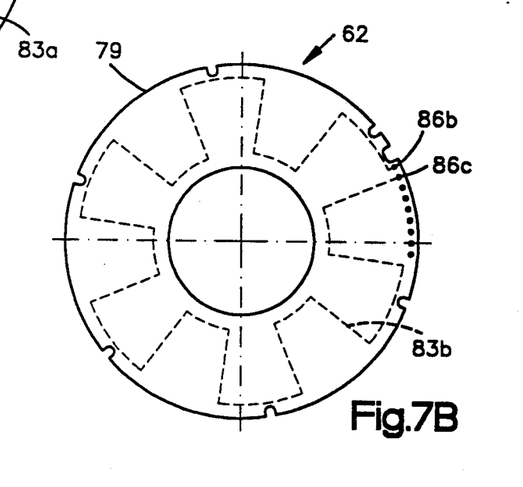
FIG. 7B is a plan view as viewed from the top face of the third layer of the receiver disk of the rotor position sensor shown in FIG. 1 showing the receiver pattern on the bottom face of that layer.

The receiving disk 62 is a multi-layer disk made from a printed circuit board material The receiving disk comprises three disk layers 77, 78, 79. When assembled, the disks are secured together with an insulating layer therebetween. The first disk 77 is shown in FIGS. 5A and 5B. The second disk 78 is shown in FIGS. 6A and 6B. The third disk 79 is shown in FIGS. 7A and 7B. FIGS. 5B, 6B, and 7B are viewed from the same side of the disk as the view shown in FIGS. 5A, 6A, and 7A, respectively. This is done so that it is easier to see that the patterns on each of the two sides of a disk are 180 electrical degrees out of phase relative to each other. An X-Y coordinate line is shown for each of the disks so that it is easier to see that the patterns of adjacent disks are 120 electrical degrees shifted.

As mentioned, each disk layer has a pattern on each side of the disk layer oriented 180 electrical degrees out of phase relative to each other. Each pattern on a disk side includes a plurality of radial lines, each radial line forming a pole. Each disk layer has twelve poles or twelve radial lines. Each radial line length is preferably equal to the outer and inner limits of the transmitter pattern shown in FIG. 4. The radial lines on one side of a receiving disk layer are alternately connected at the inner and outer limits Each pattern is in the form of a circle with a diameter modified in the form of a square wave. The patterns that make up the receiving disk are designated 81a, 81b, 82a, 82b, 83a, and 83b. One outer diametral line of each pattern has electric connection terminals Disk 77 has connection terminals 84a, 84b on one side and 84b and 84c on the other side. Disk 78 has connection terminals 85a, 85b on one side and 85b and 85c on the other side. Disk 79 has connection terminals 86a, 86b on one side and 86b and 86c on the other side. The "b" connection terminals are common for both sides of a disk layer.

The patterns on each, of the three layers of the receiving disk have one common connection terminal 84c, 85c, 86c, connected to the common connection terminal of the other two coil patterns on the other layers. The common connection terminals 84c, 85c, and 86c of the receiving disk 62 and the three other connection terminals 84a, 85a, and 86a are all connected to the drive control circuit 150.

The primary coil 60 of the rotary position sensor 54 is driven with a sinusoidal signal having a frequency of 200 kHz. Each of the three receiving coil sets or secondary windings will output a sinusoidal wave, each being electro-mechanically offset from each other by 120 degrees. The output signal from the receiving coils can be express as:

$$V1 = V \sin(\omega t) \sin(\alpha + 0)$$

$$V2 = V \sin(\omega t) \sin(\alpha + 120)$$

$$V3 = V \sin(\omega t) \sin(\alpha + 120)$$

where $\omega t$ is the drive circuit frequency, $\alpha$ is the shaft angle in electro-mechanical degrees, and the equations represent the value of the voltage present across its associated coil. This yields three equations with three unknowns. As the transmitting disk 60 rotates relative to the receiving disk 62, as occurs when the rotor moves relative to the stator, the values output from the three coils varies. At any instant in time (including a time when the disks are relatively stationary), the value of the voltage present at the outputs of the receiving coils can be measured and the equations can be solved for $\alpha$. The solution of the equations for $\alpha$ represents the rotary position of the motor rotor relative to the stator or to the motor housing. Knowing the position of the rotor relative to the stator permits control of the commutation of the motor.

The position sensor, as mentioned, has twelve poles The poles are arranged so that the output of the receiving patterns will go through six cycles for each 360 degrees of relative rotation between the transmitting disk and the receiving disk or between the rotor and the stator. If one output of a receiving pattern were to be observed, the output voltage would follow a sine wave pattern and end at its starting point each 1/6 th of a relative rotation between the stator and the rotor. Therefore, the voltage at the output of a receiving pattern goes through a 360 electrical degrees for each 60 degrees of mechanical rotation between the rotor and the stator.

Disk 62 has an associated backing material 90 mounted thereto on the side opposite the transmitting disk 60. Disk 60 has an associated backing material 92 mounted thereto on the side opposite the receiving disk 62. Coil 122 has a backing material 94 mounted thereto and coil 124 has a backing material 96 mounted thereto The backing materials 90, 92, 94, and 96 are made from a material that will provide a return path for their associated magnetic circuit. The back material is made from material that will also provide filtering for electro-magnetic interference from outside sources and even from the operation of the electric assist motor itself The magnetic permeability of air is one. The backing materials are made from material having a magnetic permeability greater than one and preferably equal to 40 at a drive frequency of 200 kHz. Preferably, the backing material is made from powdered iron, soft sintered ferrite, or sendust/iron particle filed plastic.

Referring back to FIG. 1, a position sensor 100 is operatively connected across the input shaft 16 and the output shaft 17 and provides an electrical signal having a value indicative of the relative rotational position between the input shaft and the output shaft. The position sensor 100 in combination with the torsion bar 18 form a torque sensor 110. The output of the position sensor is indicative of the applied steering torque to the vehicle steering wheel 12 by the vehicle operator.

The output of the torque sensor 110 is connected to a lead/lag filter 112. The lead/lag filter 112 processes the torque signal and separates it into a direction signal 114 and a magnitude signal 116. In processing the torque signal, the lead/lag filter 112 amplifies the value of the torque signal.

The torque magnitude value 116 is converted to a torque command signal preferably by use of a torque look-up table 118 based upon the torque magnitude. Those skilled in the art will realize that filtering of the output of the torsion sensor signal may be distributed differently about the torque command table than is specifically shown and described. For example, the output of the position sensor may be directly connected to the table 118 and the filtering occurring at the output of the table.

A speed sensor 119 is operatively connected to the vehicle and outputs a signal having a value indicative of the vehicle's speed. Those skilled in the art appreciate that a vehicle speed sensor includes a device connected to the vehicle wheels or to the vehicle transmission that generates pulses at a frequency that is a function of the vehicle speed. The speed sensor further includes circuitry that converts the pulse frequency into a signal having a value indicative of the vehicle speed.

The output of the speed sensor 119 and the output from the torque command table 118 are combined in a speed fold-back circuit 121. As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases The output 126 of the speed fold-back circuit is a torque command signal that is "corrected" as a function of vehicle speed The output 126 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle the instant the vehicle is being started It is not uncommon for the vehicle operator to be applying torque to the steering wheel with one hand while he is turning the ignition switch to the starting position If full power assist were immediately available, the steering wheel would jerk in his hand. The soft start circuit prevents this unpleasant event from happening and simulates the operation of a hydraulic power assist steering system which does not provide full power assist until the vehicle motor is running at speed (as opposed to cranking speed)

The output of the soft start circuit, after an initial time delay for starting of the vehicle, is the torque demand or request signal "corrected" for vehicle speed. The output of the soft start circuit is connected to a thermal and current fold-back circuit 138 that further modifies the torque request signal as a function of the current through the motor and the temperature of the power switch used to drive the motor. The output of the fold-back circuit 138 is connected to the torque command and direction circuit 140. The direction signal 114 is also connected to the torque command and direction circuit 140. The circuit 140 recombines the torque direction signal with the torque request signal that has been "corrected" for (i) vehicle speed, (ii) soft start, (iii) sensed motor current, and (iv) sensed temperature of the power switches The output of the torque command and direction circuit 140 is connected as one input of a summing circuit 142.

The output of the summing circuit 142 is connected to the input of a drive control circuit 150. The output of the motor position sensor 54 is also connected to the drive control circuit 150. Based upon the torque command signal and direction output from the summing circuit 142 and based upon the position of the rotor, the drive control circuit 150 provides a motor control signal used to control energization of the electric assist motor 26 in terms of sequence and current applied to the stator coils through a plurality of power switches 154.

The drive control circuit 150 is preferably is a microcomputer. Commutation or drive pulses may need to be output to the stator windings at a rate faster than the motor position data can be processed from the sensor 54 to insure smooth operation of the variable reluctance motor. To solve this problem, it is preferable that the position of the rotor be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19 th ASILOMAR Conference on Circuits, Systems & Computers, November 6-8, 1985, both papers being hereby fully incorporated herein by reference.

Referring to FIG. 10, a typical drive circuit is shown for a pair of the stator coils Aa. The main drive switch 160 is operatively connected between one side of the stator coil and electrical ground. The other side of the coil pair Aa is connected to the vehicle battery through a filter network 162. Current control is accomplished by the drive control circuit pulse-width-modulating ("PWM") the switch 160. The drive control circuit 150 further controls switching of a switch 164 which is connected in parallel with the stator coil pair through a series connected diode 166. The switch 164 provides a return of energy when the coil pair Aa is deenergized. Zener diode 168 provides a current return path.

A temperature sensor 180 is operatively connected to the power switches 160 of each coil pair and is preferably connected to a common heat sink to which the power switches 160 are mounted. The output of the temperature sensor is connected to the thermal and current fold-back circuit 138. If the temperature of the power switches 160 is too high, i.e., greater than a predetermined value, the torque demand signal is decreased to prevent the power switches from burning out.

A motor current sensor 190 is operatively connected to the electric motor 26 for sensing the amount of current therethrough. The output of the current sensor 190 is connected to the thermal and current fold-back circuit 138. If the sensed current through the motor is too high, i.e., greater than a predetermined value, the torque demand signal is decreased to prevent the power switches from burning out The output from the rotor position sensor 54 is also connected to a motor speed sensor circuit 200. The change in the rotor position as a function of time is indicative of the rotor and, in turn, the motor speed. The output of the motor speed sensing circuit is an electric signal having a value indicative of the motor speed. Rather than differentiating the rotor position, i.e., change in rotor position as a function of time, those skilled in the art will appreciate that other speed sensing arrangements could be used to determine rotor speed such as a tachometer connected to the rotor or a curve fitting arrangement using look-up tables.

The output of the speed sensor 200 is connected to a decision circuit 202 that determines if the motor speed $W_M$ is greater than a predetermined value "x". If it is, then the value of the motor speed from the sensor 200 is passed to a multiplier circuit 210.

Figure 11:
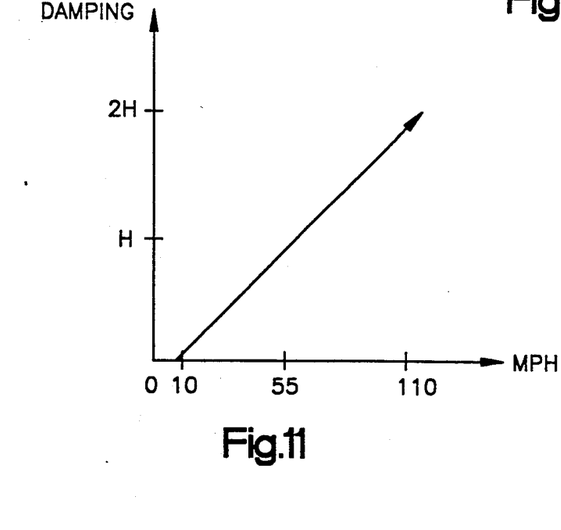
FIG. 11 is a graphical representation of the damping characteristic of the present invention as a function of vehicle speed.

The vehicle speed sensor 119 is connected to a damping control circuit 220 that outputs a damping control signal having a value functionally related to the value of the sensed vehicle speed. Referring to FIG. 11, a linear function between a damping value and sensed vehicle speed is depicted. For a vehicle speed less than 10 mph, the damping value output from the circuit 220 is zero. At 55 mph, the damping value is that equal to the damping value found in a hydraulic power assist steering system at that speed. At 110 mph, the damping value output from the circuit 220 is preferably equal to twice that found in a hydraulic power assist steering system at 55 mph. The output of the damping control circuit 220 is connected as a second input of the multiplier circuit 210. The output of the multiplier circuit 210 is the second input of the summing circuit 142.

When a vehicle is in a steering maneuver, i.e., the steering wheel and the steerable wheels are turned while the vehicle is traveling, road forces and caster of the steerable wheels tend to return the steerable wheels to a straight-ahead position. Damping is the amount of retarding force to the return of the steerable wheels to the straight-ahead position. If the damping is equal to zero, there is no resistance to the wheels returning to the straight-ahead position. If the vehicle is traveling at a high rate of speed and the damping is zero, the vehicle may become unstable resulting in increasing yaw rate of the vehicle and "spinning-out."

The damping of the vehicle yaw by control of the electric assist steering in accordance with the present invention is functionally related to both the sensed vehicle speed and the sensed speed of the power assist motor. The damping when the vehicle is traveling at less than 10 mph is zero since the return force acting on the vehicle steerable wheels at less than 10 mph is very small. As the vehicle speed increases, the damping value output from the circuit 220 increases. The output from the circuit 200 is providing a value indicative of how fast the steerable wheels are returning to the straight-ahead position. The faster the steerable wheels ar returning toward center, the greater the damping that will be in effect. Based on vehicle steering system geometry, other damping coefficient calibration may be desirable for good "feel." The damping value from the output of the multiplier 210 is the negative input to the summing circuit 142.

It should be appreciated that the damping in accordance with the present invention is functionally related to the motor rate feed-back and is also functionally related to the sensed vehicle speed. Although one would like an electric assist system to simulate the feel of a hydraulic system, the present arrangement provides an improved handling stability at high vehicle speeds, e.g., greater than 55 mph, over that of known hydraulic assist steering systems.

It should further be appreciated that it is desirable to include self-diagnostic features in the drive control circuit to issue proper operation of the power assist arrangement. Such a diagnostic arrangement for electric assist steering systems is fully described in U.S. Pat. No. 4,660,671 which is hereby fully incorporated herein by reference.

The control arrangement depicted in FIG. 1 shows modification of the torque signal in summing circuit 142 by the value of the damping from circuit 220 (vehicle speed) and from the motor speed sensor 200. The effect of modifying the torque signal is the final result of modifying the motor control signal from the output of the drive control circuit 150. In a preferred embodiment of the present invention, the summing circuit 140 and the multiplier 210 are part of the microcomputer that makes up the drive control circuit 150. If a single microcomputer was shown, the output of circuit 220, the output of the circuit 140, and the output of the sensor 200 could be directly connected to the microcomputer that makes up the drive control circuit 150.

Figure 12:
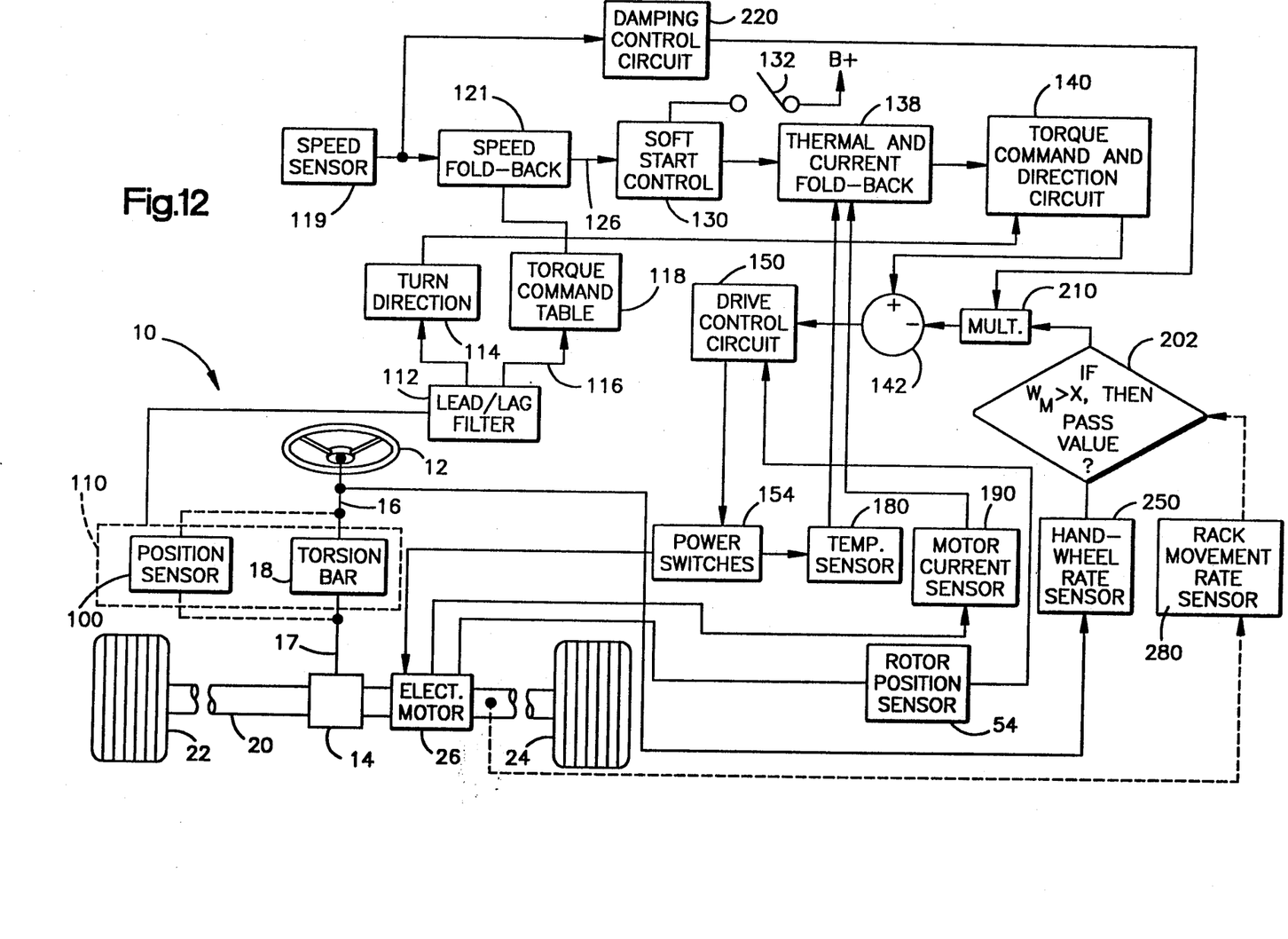
FIG. 12 is a schematic block diagram illustrating a power assist steering system in accordance with another embodiment of the present invention.

Referring to FIG. 12, another embodiment of the present invention is shown. The system shown is similar to that of FIG. 1 with like reference numerals designating like elements of structure. Rather than sensing the rotor position for feedback used for yaw control, the rate of hand-wheel rotation is sensed. The hand-wheel rotation rate is functionally related to the motor rotor rate. A hand-wheel rate sensor 250 is operatively connected to the vehicle steering wheel 12 and outputs a signal having a value indicative of the rate of rotation of the hand-wheel or the steering wheel. Such a sensor could include a rotary position sensor with a circuit that monitors the rotational position change of the steering wheel as a function of time. The output of sensor 250 is a value functionally related to rotor speed. The output of sensor 250 is connected to decision circuit 202 If the determined rotor rate is greater than a predetermined value, the rate value is passed to the multiplier unit 210 for further processing and control as described above with regard to FIG. 1.

It is also contemplated that other measurements can be made to derive a value that is functionally related to the speed of the motor rotor. One example of another measurement is to measure the linear speed of the rack member. FIG. 12 shows the alternative of having a rack movement rate sensor 280 operatively connected to the rack 20 for providing a signal having a value indicative of the rack speed. The value output from the sensor 280 is functionally related to the value of the motor speed. The output of the sensor 280 is connected to the decision circuit 202 which functions as described above. The linear speed of the rack member is functionally related to the rotor speed. Also, the rate of angular steering angle change of the steerable wheels is functionally related to the rotor speed and may be measured.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, the following is claimed:

1. An electric assist steering system for use in a vehicle, comprising:
   torque sensor means for sensing applied steering torque and providing an electric torque signal having a value indicative of said applied steering torque;
   a variable reluctance, electric assist motor having a stator and a rotor;
   drive means drivably connecting said rotor of said variable reluctance, electric assist motor to a steering member for, when said variable reluctance, electric assist motor is energized, providing a drive force to said steering member so as to provide power assisted steering;
   rotor position sensing means operatively connected between said rotor and said stator of said variable reluctance, electric assist motor for sensing the relative position between said rotor and said stator and for providing an electric motor position signal indicative thereof;
   control means connected to said torque sensor means, to said rotor position sensing means, and to said variable reluctance, electric assist motor for providing a motor control signal to control energization of said variable reluctance, electric assist motor in response to said electric torque sensor signal and said electric rotor position signal, said control means including a drive control circuit means for providing said motor control signal to energize said variable reluctance, electric assist motor by commutating electrical current to said variable reluctances, electric assist motor in response to said electric rotor position signal at a magnitude in response to said electric torque sensor signal;
   motor speed determining means operatively connected to said rotor position sensor means for determining speed of said rotor of said motor in response to said electric rotor position signal; and
   modifying means for modifying said motor control signal in response to said determined speed of said rotor of said motor so as to dampen vehicle yaw during a steering maneuver.

2. The system of claim 1 further including a vehicle speed sensor means operatively connected to said modifying means for providing an electric vehicle speed signal having a value indicative of vehicle speed, said modifying means further modifying said motor control signal in response to said electric vehicle speed signal.

3. The system of claim 2 wherein said modifying means includes a speed fold-back circuit means connected to said vehicle speed sensor means for providing a speed fold-back signal that multiplies said electric vehicle speed signal by a gain value that varies as a function of vehicle speed, said modifying means modifying said motor control signal further in response to the electric vehicle speed signal times said gain value.

4. The system of claim 2 wherein said modifying means includes a damping control circuit means connected to said vehicle speed sensor means for providing a damping value functionally related to said electric vehicle speed signal, said modifying means modifying said motor control signal further in response to said damping value provided from said damping control circuit means.

5. The system of claim 2 further including a lead/lag filter means connected to said torque sensor means for separating said electric torque signal into a torque direction signal and a torque magnitude signal, said system further comprising a speed fold back circuit means connected to said torque magnitude signal and said vehicle speed sensor means for providing a first modified torque magnitude signal having a value that decreases as sensed vehicle speed increases, said control means providing said motor control signal in response to said first modified torque magnitude signal, said torque direction signal, said speed of said rotor of said motor, and said vehicle speed signal, said torque magnitude signal output from said lead/lag filter means having a value functionally related to said value of said electric torque signal and a value functionally related to a change in said value of said electric torque signal.

6. The system of claim 5 further including a soft-start circuit means operatively connected to said first modified torque signal from said speed fold-back circuit means and to a vehicle ignition switch for providing a second modified torque magnitude signal having a value that is initially at a predetermined value when said ignition switch is first closed and increases to a value equal to said value of said first modified torque signal within predetermined time period, said control means providing said motor control signal in response to said second modified torque magnitude signal, said torque direction signal, said speed of said rotor of said motor, and said vehicle speed signal.

7. The system of claim 6 wherein said system further includes a temperature sensor connected to said drive control circuit means for providing an indication of the temperature of said drive control circuit means, a current sensor connected to said drive control circuit means for providing a signal indicative of the amount of electric current applied to said variable reluctance, electric assist motor, and a thermal and current fold-back circuit means connected to said soft-start circuit means, said temperature sensor, and said current sensor for decreasing said value of said second modified torque signal if said sensed temperature of said drive control circuit exceeds a predetermined value and decreasing said value of said second modified torque signal if said sensed current applied to said variable reluctance, electric assist motor exceeds a predetermined value.

* * * * *